United States Patent

[11] 3,596,122

| [72] | Inventor | Charles G. Stewart<br>Solihull, England |
|---|---|---|
| [21] | Appl. No. | 796,316 |
| [22] | Filed | Jan. 31, 1969 |
| [45] | Patented | July 27, 1971 |
| [73] | Assignee | Girling Limited<br>Birmingham, England |
| [32] | Priority | Feb. 2, 1968 |
| [33] | | Great Britain |
| [31] | | 5,371/68 |

[54] "INSIDE OUT" DYNAMO ELECTRIC MACHINES
11 Claims, 2 Drawing Figs.

[52] U.S. Cl. .................................................. 310/67,
310/168
[51] Int. Cl. .................................................. H02k 7/00
[50] Field of Search .......................................... 310/67, 68,
70, 71, 168, 156, 266, 90, 263

[56] References Cited
UNITED STATES PATENTS

| 2,701,845 | 2/1955 | Gallagher et al. | 310/90 |
| 3,312,844 | 4/1967 | Juhnlte et al. | 310/266 X |
| 3,484,635 | 12/1969 | MacKallor, Jr. | 310/266 |
| 3,179,825 | 4/1965 | Terry et al. | 310/67 |
| 3,462,626 | 8/1969 | Kluss | 310/67 X |

*Primary Examiner*—D. F. Duggan
*Attorney*—Holman and Stern

ABSTRACT: A dynamo electric machine comprising a rotor structure and a stator structure the rotor structure being adapted to be secured to a shaft the speed of which is to be measured, a bearing supported by the rotor structure and the stator structure being carried by said bearing and a pin and slot connection between the stator structure and a fixed member whereby as the shaft rotates relative angular movement will take place between the rotor and stator structure.

"INSIDE OUT" DYNAMO ELECTRIC MACHINES

This invention relates to dynamo electric machines of the kind comprising a rotor structure and a stator structure and has for its object to provide such a machine in a simple and convenient form, whereby it can be used to provide an electrical signal indicative of the speed of rotation of a rotary shaft.

The object of the invention is to provide such a machine in a simple and convenient form.

According to the invention a machine of the kind specified comprises in combination, a toothed rotor structure adapted to be secured to the shaft, the speed of which is to be measured, a bearing supported by the rotor structure, a stator structure carried by said bearing and a pin and slot connection between the stator structure and a fixed member whereby as the shaft rotates relative angular movement will take place between the rotor and stator structures.

One application for such a dynamo electric machine is in wheel slip detection equipment for locomotives and one example of a dynamo electric machine specifically designed for this application will now be described.

Figure 1:
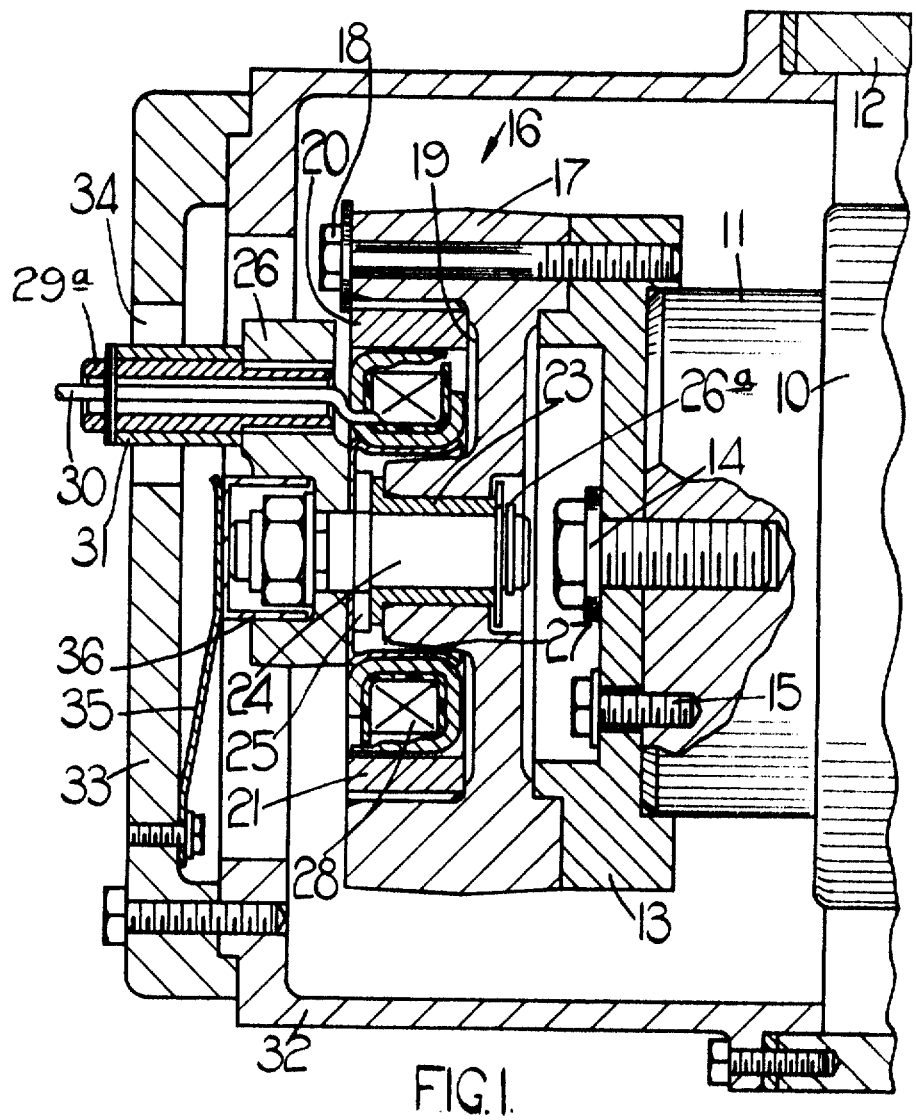
FIG. 1 is a sectional side elevation showing one example of a dynamo electric machine mounted in its working position, he section being on the line 1-1 of FIG. 2.
Figure 2:
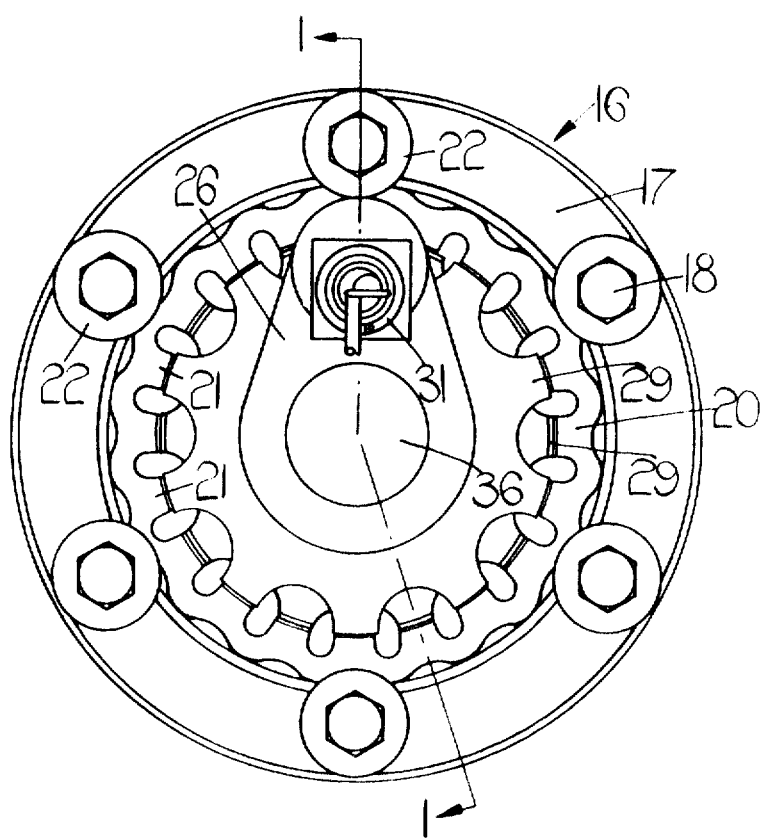
FIG. 2 is an end view of the machine of FIG. 1 with a cover removed.

In FIG. 1 of the drawings the end of an axle 10 of a locomotive is shown having a reduced end portion 11 projecting from a housing 12. Secured to the reduced end portion of the axle is an adapter plate 13 which defines an external flange engaged about the periphery of the reduced portion 11 of the axle. The adapter plate is secured to the axle by means of a centrally disposed bolt 14 and to prevent relative rotation of the adapter plate and axle a bolt 15 is provided which is off set from the axis of rotation of the axle.

Also provided is a rotor structure generally indicated at 16 and which includes an annular member 17 which is secured at its periphery to the adapter plate 13 by means of a plurality of angularly spaced bolts 18. The annular member and the adapter plate are provided with cooperating flange portions to ensure accurate location of the rotor structure on the adapter plate. The side of the annular member which is remote from the axle is hollowed to define an annular recess 19 and mounted within the recess and forming part of the rotor structure is an annular magnet 20. The outer periphery of the magnet 20 is of sinuous form with the crests of the magnet acting to locate the magnet relative to the outer periphery of he recess 19. Moreover, the inner periphery of the magnet is toothed and defines pole pieces 21, adjacent pole pieces being of opposite polarity. The magnet is retained within the recess 19 by washers 22 which are retained by the bolts 18.

The annular member 17 is provided with a central flanged bearing bush 23 and in which is mounted a cylindrical stub shaft 24. The stub shaft is threaded at its end remote from the axle and intermediate its ends is provided with a flange 25. Also provided is an arm 26 having an aperture through which the stub shaft extends and the arm is retained upon the stub shaft by a nut engaged with the threaded portion of the stub shaft. Disposed between the arm 26 and the flange 25 is the base wall of a cup-shaped part 27 the cylindrical portion of which enters into the recess 19. At the end of the stub shaft remote from the nut there is provided a circlip 26a which acts to prevent the stub shaft falling out of the bearing bush during assembly.

The cup-shaped part 27 acts as the mounting member of a stator structure which includes an annular winding 28 wound upon a former, and a core structure which defines pole teeth 29 adjacent teeth extending in opposite axial directions. The spacing of adjacent teeth is equal to the spacing of the pole pieces 21 and the arrangement is such that as relative angular movement of the rotor and stator structures occurs the side members of the core structure have alternate polarity and a voltage is induced in the winding 28.

Secured to the arm 26 is a hollow pin 29a through which extends the connecting leads 30 to the coil. Moreover, surrounding the pin is a bush 31 formed from wear resisting synthetic resin material. The machine is enclosed within an open ended housing 32 which is secured to the housing 12 and the housing 32 is provided with a closure plate 33 in which is formed a slot 34 through which extends the pin 29a Since the housing is fixed relative to he axle the stator structure is held against rotation, the pin and slot connection between the arm and the closure plate 33 allowing for any end float and/or lateral movement of the axle.

In order to bias the stator assembly so that the flange 25 bears against a thrust face defined by the flange of the bush 23, a leaf spring 35 is provided one end of which is secured to the closure plate 34 and the other end of which bears against the exterior of the base wall of a cup shaped part 36 which is pressed into a recess in the arm 26. The action of the leaf spring ensures that the rotor structure is accurately located in the axial direction relative to the stator structure and also the leaf spring ensures that the circlip 26 is not subjected to any axial thrust.

In an alternative arrangement the leaf spring is replaced by a coiled compression spring which is positioned intermediate the closure plate and the arm. In this case the cup shaped part 36 is omitted and the spring is partly located within the recess in the arm 26. Moreover, if desired the pin 29 instead of being mounted upon the arm 26 can be mounted upon the closure plate 33, the end of the arm being suitably forked for engagement with the pin.

Having thus described my invention what I claim as new and desire to secure by Letters Patent is:

1. A dynamo electric machine for mounting on a fixed part which houses a rotary shaft carried in a bearing, said machine providing an electrical signal indicative of the speed of rotation of the shaft, said machine comprising, in combination: a toothed rotor structure adapted to be secured to the rotary shaft; bearing means supported by said rotor structure; a stub shaft associated with said bearing means, said stub shaft having a flange thereon; a stator structure carried by said bearing means and said stub shaft; resilient biasing means for urging said flange into contact with a thrust face defined on said rotor structure; a pin and alot connection between said stator structure and a stationary member which is coupled to the fixed part which houses the rotary shaft, said pin and slot connection including an arm coupled to said stator structure running between said stator structure and said stationary member, whereby as the shaft rotates relative angular movement will take place between said rotor and stator structure.

2. A machine as claimed in claim 1 including means for locating the rotor and stator structures relative to each other in an axial direction.

3. A machine as claimed in claim 1 in which the stator structure is mounted upon a cup-shaped part, the base wall of which is provided with an aperture through which the stub shaft extends, the base wall being sandwiched between said arm and the flange of the stub shaft.

4. A machine as claimed in claim 3 in which the arm and the cup-shaped part are retained upon the stub shaft by means of a nut engaged with a screw threaded portion of the stub shaft.

5. A machine as claimed in claim 4 in which the end of the stub shaft remote from the nut is provided with a circlip to prevent separation of the rotor and stator structures after assembly.

6. A machine as claimed in claim 5 in which said bearing means comprises a bush in which the stub shaft is located, the end of the bush adjacent the flange having an outwardly extending flange the end face of which defined said thrust face.

7. A machine as claimed in claim 6 in which said arm carries the pin of said pin and lot connection, the pin being bored to accommodate electrical connections to a coil carried by the stator structure and in which the electrical signal is induced.

8. A machine as claimed in claim 7 in which the rotor structure includes a member of annular form and which has defined in its face presented to the arm, an annular recess said recess adjacent its inner periphery serving to accommodate said winding, and mounting on its outer periphery, an annular magnet.

9. A machine as claimed in claim 8 in which the magnet is retained within the recess by washers carried by bolts respectively extending through the annular member.

10. A machine as claimed in claim 11 in which said bolts secure the annular member to an adapter plate which is adapted to be secured to the shaft.

11. A machine as claimed in claim 10 in which the resilient means is in the form of a leaf spring one end of which is secured to said fixed member and the other end of which bears upon the base wall of a cup-shaped member pressed into a recess formed in the arm and accommodating said nut.